Patented Oct. 23, 1934

1,978,069

UNITED STATES PATENT OFFICE 1,978,069

PRODUCING DIPHENYL

William H. Williams, Midland, Mich., assignor to The Dow Chemical Company, Midland, Mich., a corporation of Michigan No Drawing. Application April 26, 1933, Serial No. 668,039

10 Claims. (Cl. 260—168)

The present invention is concerned with the production of diphenyl by pyrolysis of benzene, and has particular regard to preventing interruptions of the process caused by the formation of carbon deposits in the pyrolyzing apparatus.

In my prior applications, Serial No. 514,450, filed February 9, 1931, and Serial No. 648,654, filed December 23, 1932, I have described a method and apparatus for pyrolyzing benzene in which the benzene vapors are passed through electrically heated carbon or graphite tubular elements maintained at temperatures between 650° and 950° C. The vapors are caused to flow at a velocity such that between about 5 and 20 per cent thereof are pyrolyzed at a single pass, the conversion products consisting chiefly of diphenyl together with a small amount of higher boiling material of a tarry nature. The reaction products are condensed and separated from the residual unreacted benzene, and the latter is then recycled in the process. At the lower conversion rates the percentage of diphenyl in the reaction product is highest, and as the rate is increased the percentage of diphenyl decreases and that of tarry material increases, although the output of diphenyl may be increased. In general it has been found inadvisable to operate at a conversion rate much in excess of 20 per cent, due to excessive tar formation.

In the large scale practice of the process, however, operating difficulties are encountered which are due largely to the gradual formation of adherent deposits of carbon in the tubular apparatus. The accumulation of carbon gradually constricts the bore of the tubes, thereby disturbing the balance between gas flow and electric current, and eventually may cause stoppage of gas flow if the obstruction is not removed. Consequently periodical shutdowns have been necessary, for the purpose of cleaning carbon out of the tubes. The carbon deposits are found not only in the electrically heated carbon pyrolyzer tubes, but also in the metallic tubes connected therewith for leading in the vapors and carrying off the reaction product. As a rule carbon formation is greatest in these metallic connecting tubes close to the junction with the carbon tubes. The frequent process interruptions due to the cause just explained add considerably to the operating cost. In addition to the carbon deposits, more or less loose or "sooty" carbon is also formed, which accompanies the reaction gases and contaminates the condensate obtained therefrom. Such carbon, however formed, represents a loss to the process, which it is desirable to prevent as far as possible.

I have discovered that the formation of carbon is inhibited by the presence of a small amount of sulphur compounds in the benzene undergoing pyrolysis. Commercially pure benzene at the present time commonly contains about 0.20 per cent of sulphur in the form of organic sulphur compounds. I have found the aforesaid pyrolyzing process can be conducted without material formation of carbon when the raw material consists of such commercial benzene containing about 0.20 per cent of sulphur. However, the continuous operation of the process involves the recycling of from 95 to 80 per cent of the benzene at each pass. Such recycled benzene has a materially reduced sulphur content, because during the pyrolysis a considerable portion of the sulphur compounds in the benzene is decomposed and escapes with the vent gases. Consequently I have found it necessary, in order to maintain the process in continuous operation without material formation of carbon deposits, to add a small amount of sulphur or volatile sulphur compound to the benzene at each cycle sufficient to compensate for that lost in the vent gases. The invention, then, consists in the improved method hereinafter fully described and particularly pointed out in the claims.

When the pyrolysis of benzene by the aforesaid process is conducted at such rate that the percentage of benzene converted at each pass is about 15 per cent by weight, for example, the benzene charge entering the pyrolyzing furnace contains about 15 per cent of fresh benzene and 85 per cent of recycled benzene. The sulphur content of the fresh benzene may be about 0.20 per cent and that of the recycled benzene about 0.14 per cent, hence the mixture would have a sulphur content of about 0.15 per cent. The sulphur content of the benzene would be rapidly depleted by the loss thereof occurring in each succeeding cycle of the process, until too little sulphur remained to be effective for preventing carbon formation. According to the invention, therefore, such losses of sulphur are made up by adding sulphur or a gaseous or easily vaporizable sulphur compound to the benzene in the process. The sulphur content of the benzene entering the pyrolyzing zone should not be less than about 0.10 per cent, and preferably should be between about 0.15 and 0.50 per cent, by weight. However, still greater amounts may be used, if desired, without departing from the principle of the invention. The addition of sulphur to the benzene may be made at any convenient point in the process cycle. For instance, it may be added directly to the recycled benzene, or along with the fresh benzene introduced as makeup in each cycle. The proportion of sulphur or sulphur compound used will vary according to operating conditions, but will be regulated to maintain the average sulphur content of the benzene pyrolyzed above the point necessary to prevent any material deposition of carbon.

When operating the process with maintenance of the sulphur content of the benzene between about 0.15 and 0.25 per cent by suitable additions of sulphur compounds to the benzene, I have been enabled to maintain continuous operation for a period of several weeks without shutdown, and at the end of the period no substantial accumulation of carbon was found in the apparatus. On the other hand, when pyrolyzing benzene largely free from sulphur, the formation of carbon deposits necessitated interrupting the process to clean out carbon at intervals varying from several hours to a few days, at most.

The addition of sulphur itself, either in vapor or powdered form, is not always convenient, owing to the much lower vapor pressure of sulphur as compared to benzene, and the use of a gaseous or easily volatilizable sulphur compound is simpler and easier to carry out. Examples of suitable sulphur compounds are sulphur dioxide, hydrogen sulphide, carbon bisulphide, mercaptans, thiophenols, thiophene, etc. In practice I prefer to use carbon bisulphide, which on account of its volatility can be introduced simply by feeding a regulated quantity of the liquid directly into the stream of benzene vapors before the latter reach the pyrolyzing zone.

The pyrolyzing process is carried out as described in the prior applications already referred to, by vaporizing benzene and passing the vapors into a reactor, wherein they are pyrolyzed by contact with electrically heated carbon surfaces maintained at a temperature above 650° C. but not exceeding 950° C. The reactor in its preferred form contains one or more tubes of carbon or graphite with electrical connections thereto. The benzene vapors are preheated by passing in contact with the outside of the electrically heated carbon tubes and then passed through the tubes wherein the temperature is raised to the point required for the formation of diphenyl. The reaction vapors are cooled and condensed to separate the readily liquefiable products from the non-condensable gases, which latter are vented off. The condensed material is distilled to separate unreacted benzene from diphenyl and other high boiling materials, such benzene being returned to the pyrolysis step after admixture with fresh benzene to make up for the amount converted to diphenyl in the previous cycle. The carbon bisulphide or equivalent sulphur compound may conveniently be introduced along with the fresh benzene, a sufficient amount of the sulphur compound being added to raise the sulphur content of the mixed benzene vapors to the desired point to prevent carbon deposition in the reactor. A further advantage of operating in the manner described is that metallic surfaces of the reactor which come in contact with the hot benzene vapors may be made of usual structural materials suitable for use at the temperatures employed, thus avoiding all necessity for using special metals or alloys, or to provide surfaces with specially prepared protective coatings for counteracting the formation of carbon deposits, as has been previously proposed.

Although the invention has been particularly described as applied to the process wherein benzene is pyrolyzed by contacting with electrically heated carbon or graphitized carbon surfaces, nevertheless it is not limited thereto. It is also applicable to any process for producing diphenyl wherein benzene is subjected to a temperature between 650° and 950° C. in a pyrolyzing zone, irrespective of the mode of heating employed, whether electrical, by means of an externally heated retort, or by passing the benzene vapors through a bath of molten metal or salt.

Other modes of applying the principle of my invention may be employed instead of the one explained, change being made as regards the process herein disclosed, provided the step or steps stated by any of the following claims or the equivalent of such stated step or steps be employed.

I therefore particularly point out and distinctly claim as my invention:—

1. In a process of producing diphenyl, wherein benzene is pyrolyzed by heating at a temperature between 650° and 950° C., the improvement which consists in maintaining in the benzene a sulphur content in excess of about 0.10 per cent by adding a substance from the class consisting of sulphur and volatile sulphur compounds to the benzene before it enters the pyrolyzing zone.

2. In a process of producing diphenyl, wherein benzene is pyrolyzed by heating at a temperature between 650° and 950° C., the improvement which consists in maintaining in the benzene a sulphur content in excess of about 0.10 per cent by adding carbon bisulphide to the benzene before it enters the pyrolyzing zone.

3. In a process of producing diphenyl, wherein benzene is pyrolyzed by heating at a temperature between 650° and 950° C. and unreacted benzene is separated from the reaction product and recycled in the pyrolyzing step, the improvement which consists in adding a substance from the class consisting of sulphur and volatile sulphur compounds to the recycled benzene in amount sufficient to maintain the sulphur content thereof in excess of about 0.10 per cent.

4. In a process of producing diphenyl, wherein benzene is pyrolyzed by heating at a temperature between 650° and 950° C. and unreacted benzene is separated from the reaction product and recycled in the pyrolyzing step, the improvement which consists in adding a substance from the class consisting of sulphur and volatile sulphur compounds to the recycled benzene in amount sufficient to maintain the sulphur content thereof between about 0.15 and about 0.50 per cent.

5. In a process of producing diphenyl, wherein benzene is pyrolyzed by heating at a temperature between 650° and 950° C. and unreacted benzene is separated from the reaction product and recycled in the pyrolyzing step, the improvement which consists in mixing such recycled benzene with a component of fresh benzene and with a sufficient amount of a substance from the class consisting of sulphur and volatile sulphur compounds to produce in the benzene mixture a sulphur content between about 0.15 and 0.50 per cent and thereupon introducing the mixture into the pyrolyzing step.

6. In a process of producing diphenyl, wherein benzene is pyrolyzed by heating at a temperature between 650° and 950° C. and unreacted benzene is separated from the reaction product and recycled in the pyrolyzing step, the improvement which consists in adding carbon bisulphide to the recycled benzene in amount sufficient to maintain the sulphur content thereof between about 0.15 and about 0.50 per cent.

7. In a process of producing diphenyl, wherein benzene is pyrolyzed by heating at a temperature between 650° and 950° C. and unreacted benzene is separated from the reaction product and recycled in the pyrolyzing step, the improvement which consists in mixing such recycled benzene with a component of fresh benzene and with a sufficient amount of carbon bisulphide to produce in the benzene mixture a sulphur content between about 0.15 and 0.50 per cent and thereupon introducing the mixture into the pyrolyzing step.

8. The process of producing diphenyl which comprises passing benzene through a pyrolyzing zone in contact with electrically heated carbon surfaces at a temperature between 650° and 950° C., separating unreacted benzene from diphenyl and higher boiling reaction products, adding a substance from the class consisting of sulphur and volatile sulphur compounds to such separated benzene in amount sufficient to produce a sulphur content in excess of 0.10 per cent therein, and returning such sulphur-containing benzene to the pyrolysis step.

9. The process of producing diphenyl which comprises passing benzene through a pyrolyzing zone in contact with electrically heated carbon surfaces at a temperature between 650° and 950° C., separating unreacted benzene from diphenyl and higher boiling reaction products, adding to such separated benzene a component of fresh benzene and a sufficient amount of a substance from the class consisting of sulphur and volatile sulphur compounds to produce a sulphur content between about 0.15 and 0.50 per cent in the benzene mixture, and introducing said mixture into the pyrolyzing zone.

10. The process of producing diphenyl which comprises passing benzene through a pyrolyzing zone in contact with electrically heated carbon surfaces at a temperature between 650° and 950° C., separating unreacted benzene from diphenyl and higher boiling reaction products, adding to such separated benzene a component of fresh benzene and a sufficient amount of carbon bisulphide to produce a sulphur content between about 0.15 and 0.50 per cent in the benzene mixture, and introducing said mixture into the pyrolyzing zone.

WILLIAM H. WILLIAMS.